United States Patent
Chen et al.

(10) Patent No.: US 7,304,943 B2
(45) Date of Patent: Dec. 4, 2007

(54) APPARATUS AND METHOD FOR BANDWIDTH CONTROL

(75) Inventors: Jin-Ru Chen, TaiChung (TW); Chang-Lien Wu, TaiChung (TW)

(73) Assignee: Realtek Semiconductor Corp. (TW)

( * ) Notice: Subject to any disclaimer, the term of this patent is extended or adjusted under 35 U.S.C. 154(b) by 1042 days.

(21) Appl. No.: 10/321,993

(22) Filed: Dec. 17, 2002

(65) Prior Publication Data

US 2003/0123391 A1 Jul. 3, 2003

(30) Foreign Application Priority Data

Dec. 28, 2001 (TW) ............... 90132644 A

(51) Int. Cl.
*G01R 31/08* (2006.01)
(52) U.S. Cl. ............... 370/229; 370/230
(58) Field of Classification Search ............... None
See application file for complete search history.

(56) References Cited

U.S. PATENT DOCUMENTS 5,914,936 A * 6/1999 Hatono et al. ............ 370/230

* cited by examiner

*Primary Examiner*—Edan Orgad
*Assistant Examiner*—Robert W. Wilson
(74) *Attorney, Agent, or Firm*—Raymond Sun

(57) ABSTRACT

The present invention provides an apparatus and method for bandwidth control used in a network switch controller. The apparatus and method achieve the goals of simplifying circuits and controlling bandwidth precisely by simplification of counting operations required by bandwidth control and a design of dual counters. The apparatus comprises: a first counter; a control logic for executing a operation of adding or subtracting the first counter by one based on an increment/decrement signal and for determining if a packet is allowed to enter a queue of the switch controller based on a value of the first counter; an action device for performing actions of inputting/outputting the packet to/from the queue, wherein the action device comprises a second counter which is increased by one when a byte is inputted, the second counter is reset to zero and generates the increment signal to the control logic when increased to one unit bytes; and a timer for generating the decrement signal to the control logic every unit time. The method employs the above apparatus to input packets and decreases the first counter by one to limit data volume allowed to input during one unit time to one unit bytes.

18 Claims, 4 Drawing Sheets

| bandwidth / unit bytes | 128Kbps | 256Kbps | 512Kbps | 1Mbps | 2Mbps | 4Mbps |
|---|---|---|---|---|---|---|
| 64 bytes | 4ms | 2ms | 1ms | 500 μs | 250 μs | 125 μs |
| 128 bytes | 8ms | 4ms | 2ms | 1ms | 500 μs | 250 μs |

1 Kbps = $10^3$ bits/sec

1 Mbps = $10^6$ bits/sec 1 ms = $10^{-3}$ sec

1 μs = $10^{-6}$ sec

FIG. 5

APPARATUS AND METHOD FOR BANDWIDTH CONTROL

BACKGROUND OF THE INVENTION (a). Field of the Invention

The present invention relates in general to the field of bandwidth control, and more particularly to an apparatus and method that are able to simplify circuits and to control bandwidth precisely by providing a dual-counter design and simplifying counting operations required by bandwidth control.

(b). Description of the Prior Arts

Due to increasing diversity of Internet applications, there is increasing need for bandwidth. Therefore, it is inevitable for the rising of wideband services. For example, there are more and more Internet service providers (ISP) that provide wideband network services of asymmetrical digital subscriber line (ADSL) and cable modem. However, these two wideband services employ Ethernet connections on client side and the design goal of Ethernet is just providing bandwidth as large as possible, thus if the use of bandwidth of the client side is not controlled, the ISPs won't be able to provide a fare program with various grades for the client side (i.e. charging differently based on different bandwidths), and network equipments of the ISPs may suffer from serious congestion. Besides, for network administrators, it is necessary to control bandwidth to prevent from network congestion in face of fast-growing traffic.

For ISPs and network administrators, a network switch is employed to perform bandwidth control. The switch often utilizes a "leaky bucket" to implement the function of bandwidth control. Please refer to FIG. 1, which is a diagram depicting the operation of a leaky bucket. The leaky bucket 10 is like a funnel that can hold B tokens 11 at most. A packet 13 waiting for transmission must own tokens 11 to pass through a queue 12 onto the network. The tokens 11 decrease with continuous transmission of packets to the network. When the tokens 11 are used up, the transmission is then stopped. Therefore, if the tokens 11 of the bucket 10 are supplied with a constant rate, say R tokens/sec, then data output per unit time can be controlled to achieve the goal of bandwidth control (this is because only a constant quantity of tokens can be used per unit time). The data volume represented by each token varies with different network technologies. For instance, the size of a packet 13 in Ethernet is changeable, thus one byte is taken as the data volume for a token 11; while in Asynchronous Transfer Mode (ATM), a cell of same size is used as transmission unit, so it can be taken as the data volume for the token 11. In addition, when the bucket 10 is full, subsequently supplied tokens will be abandoned.

There are two major implementations for the leaky bucket 10. The first one is to fully implement the leaky bucket 10; the second is a simplified one, which changes the way the leaky bucket 10 supplies tokens 11 from a constant rate to resetting to a full state during every constant time. The advantage of the first one is that it can control bandwidth precisely, but its cost is too high; though the second one can reduce cost significantly, it cannot provide precise bandwidth control.

Next, a detailed description for these two implementations is provided. For the first one, there are two critical variables: stock of the tokens 11 in the bucket 10 and capacity B of the bucket 10. The stock of the tokens 11 is used to determine whether a packet 13 can pass through the queue 12. If the stock of the tokens 11 at time t is represented by CNTR (t), and the tokens 11 are supplied in the rate of R tokens/sec, then the value of CNTR (t) is the smaller of CNTR (t−1)+R and B. When implemented in circuits, a counter is used to record CNTR (t). However, the update of CNTR (t) involves additive operations of larger values, thus the design of related circuits is more complex and costs more.

The second one uses a simple ripple counter for recording the stock of the tokens 11 in the bucket 10 to reduce cost. Though it is easy for the ripple counter to implement an operation of adding or subtracting one, it's hard for it to achieve an operation of adding or subtracting larger values rapidly. Therefore, this implementation replaces the additive operation with a setting one. If the leaky bucket 10 is at first empty and tokens 11 are filled in the rate of R per second, then the bucket 10 will be full after B/R seconds. Hence, in operation, the value of the ripple counter is reset to B every B/R seconds to avoid additive or subtractive operations of larger values required by the first implementation. However, it would result in imprecise bandwidth control. This is because it is uncertain that B tokens 11 be used up during every period of B/R seconds. As long as next period arrives, there are B tokens available again for use, thus the data output per unit time is not constant and precise bandwidth control cannot be achieved.

SUMMARY OF THE INVENTION

In view of the issue mentioned above, the present invention provides a simple but precise apparatus and method for bandwidth control which can perform precise bandwidth control as the above first implementation and also lower the cost of circuit design and manufacturing as the second one.

To achieve this goal, the present invention simplifies counting operations associated with a leaky bucket such that a simple counter like ripple counter can be used to implement the bucket. Besides, precise bandwidth control in the leaky bucket is achieved by a dual-counter design.

Tokens are supplied in a rate of R per second, that is, a token is supplied per 1/R second. Each token represents a constant quantity of data, and when the quantity of data is transmitted, stock of tokens will be decreased by one. If 1/R second is taken as unit time and the constant quantity of data as unit data, then the leaky bucket increases one token every unit time and decreases one token when one unit data is transmitted. In this way, operations related to larger values originally required by the leaky bucket are simplified to ones of adding or subtracting one.

Based on this simplified design, the apparatus for bandwidth control of the present invention implements the leaky bucket by two counters (referred as first counter and second counter), a timer and a control logic, plus an action device for moving packets into or out of a queue. Its operation is as follows: the timer sends a signal to the control logic every unit time to decrease the first counter by one; whenever the action device transmits one unit data, the control logic increases the first counter by one. In the present invention, the unit data is calculated by bytes and called unit bytes. Besides, the first counter has a default threshold. When the first counter reaches the threshold, the control logic will forbid the action device to transmit packets.

In order to know when a unit bytes of data has been transmitted, the second counter is used to record the quantity of transmitted bytes. According the present invention, the second counter is configured as increasing by one whenever one byte is transmitted. When the value of the second counter has reached the size of unit bytes, it would be reset to zero. Since one unit bytes has been transmitted at this time, the control logic increases the first counter by one. Simple counter circuit is used for implementation as the first and second counter only involve the operations of adding or subtracting one or resetting.

To sum up, the apparatus and method of the present invention are able to control bandwidth precisely and also simple in circuit implementation, owing to the first counter is decreased by one every unit time and only one unit bytes of data can be transmitted during one unit time.

BRIEF DESCRIPTION OF THE DRAWINGS

FIG. 5 is a table showing how to select unit time under various bandwidth specifications and unit bytes.

DETAILED DESCRIPTION OF THE PRESENT INVENTION

Figure 1:
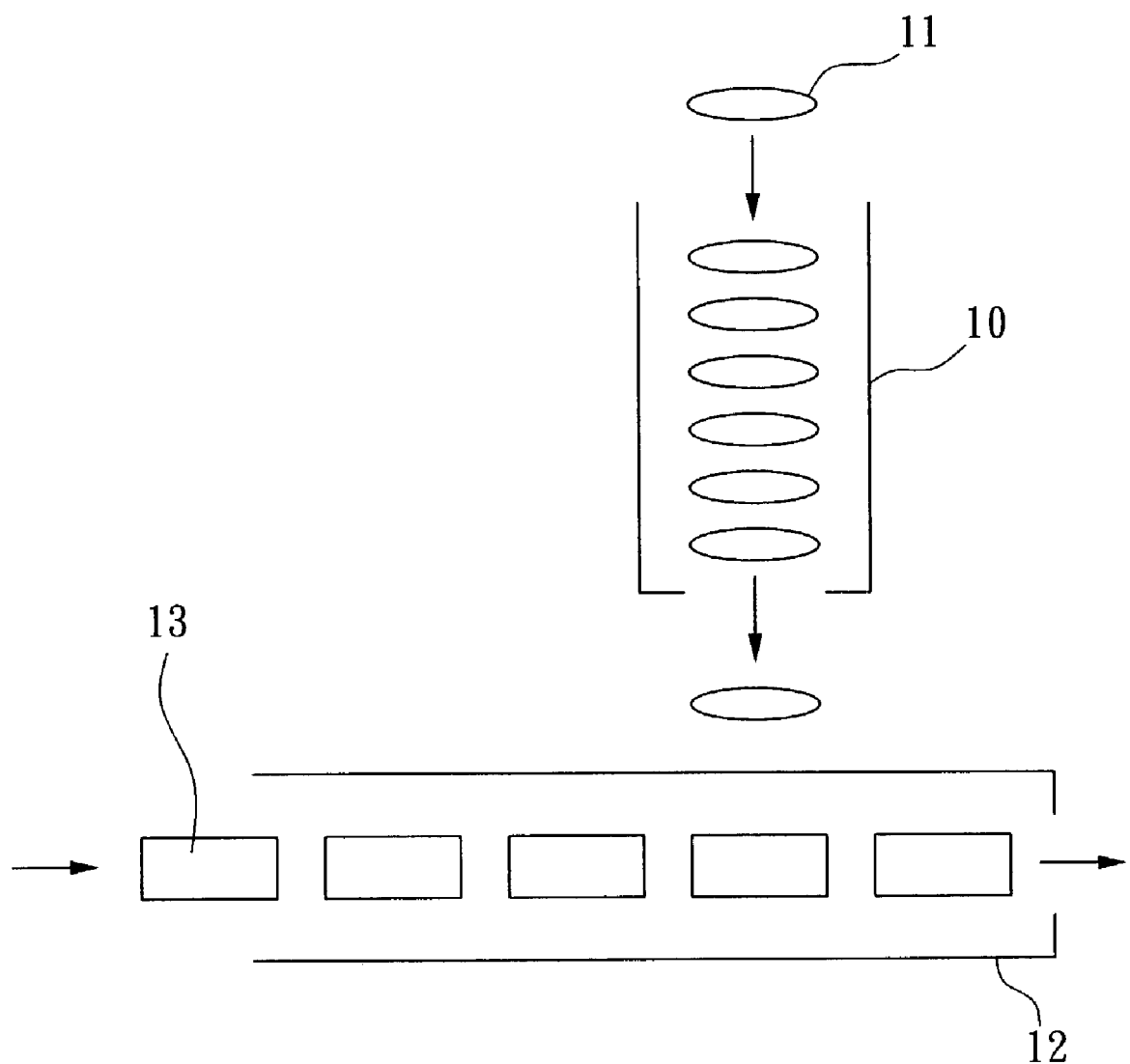
FIG. 1 is a diagram depicting the operation of a conventional leaky bucket.
Figure 2:
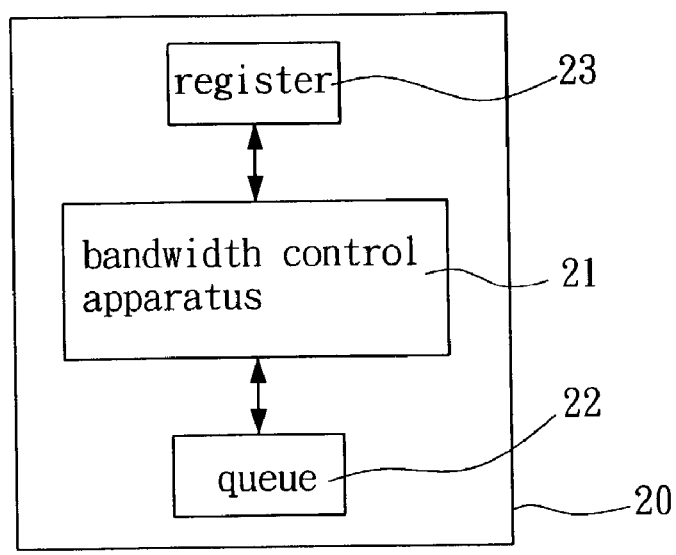
FIG. 2 is a block diagram of a switch controller employing the bandwidth control apparatus of the present invention.

This section will provide a detailed description with one preferred embodiment and appended drawings to make the goals and features of the present invention more apparent and easy to understand. Please refer to FIG. 2, which is a block diagram of a switch controller employing the bandwidth control apparatus of the present invention. As shown in FIG. 2, the switch controller comprises a bandwidth control apparatus 21, at least one queue 22, and a register 23. The switch controller 20 is used in a network switch and performs the function of packet switching. The queue 22 is used to store waiting-for-transmission packets temporally. The register 23 is used to store associated variables of bandwidth control.

Figure 3:
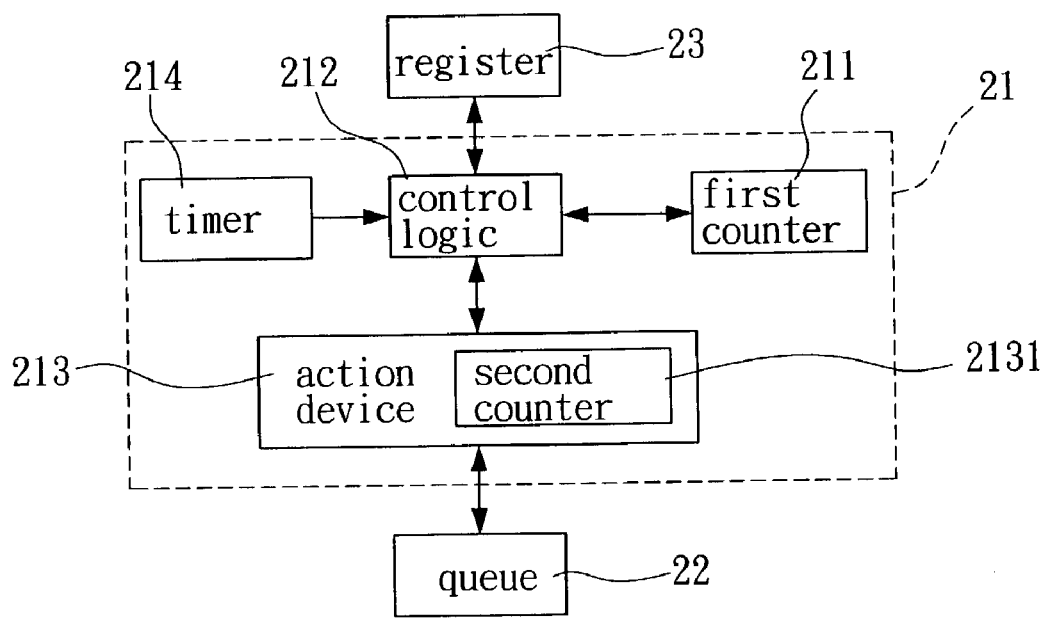
FIG. 3 is a block diagram of the bandwidth control apparatus according to the present invention

Please refer to FIG. 3, which is a block diagram of the bandwidth control apparatus 21 according to the present invention. As shown in FIG. 3, the bandwidth control apparatus 21 comprises: a first counter 211, a control logic 212, an action device 213, and a timer 214. The first counter 211, corresponding to the queue 22, has a default threshold. The control logic 212, coupled to the first counter 211, executes the operation of adding or subtracting the first counter 211 by one, and determines if a packet is allowed to enter the queue 22. The action device 213, coupled to the queue 22 and the control logic 212, performs the actions of inputting/outputting the packet to/from the queue 22, and send an increment signal to the control logic 212 whenever one unit bytes is inputted. The timer 214, coupled to the control logic 212, generates a decrement signal to the control logic 212 every one unit time.

If the control logic 212 receives the increment signal from the action device 213 and the first counter 211 does not reach its threshold, then the first counter 211 is increased by one; if the control logic 212 receives the decrement signal from the timer 214 and the value of the first counter 211 is not zero, then the first counter 211 is decreased by one.

The action device 213 further comprises a second counter 2131 associated with the queue 22. When a packet is permitted to enter the queue 22, the action device 213 increases the second counter 2131 by one after inputting a byte; when the value of the second counter 2131 reaches the size of one unit bytes, the action device 213 generates the increment signal to the control logic 212 and resets the second counter 2131 to zero.

The register 23, coupled to the control logic 212, is employed to store associated variables of bandwidth control, such as the threshold of the first counter 211, the size of unit bytes, the length of unit time, etc., which can be accessed by the control logic 212.

It is notable that since the first counter 211 and the second counter 2131 only execute the operations of adding or subtracting one and resetting, thus simple counters, for example ripple counters, can be utilized to implement them.

Figure 4:
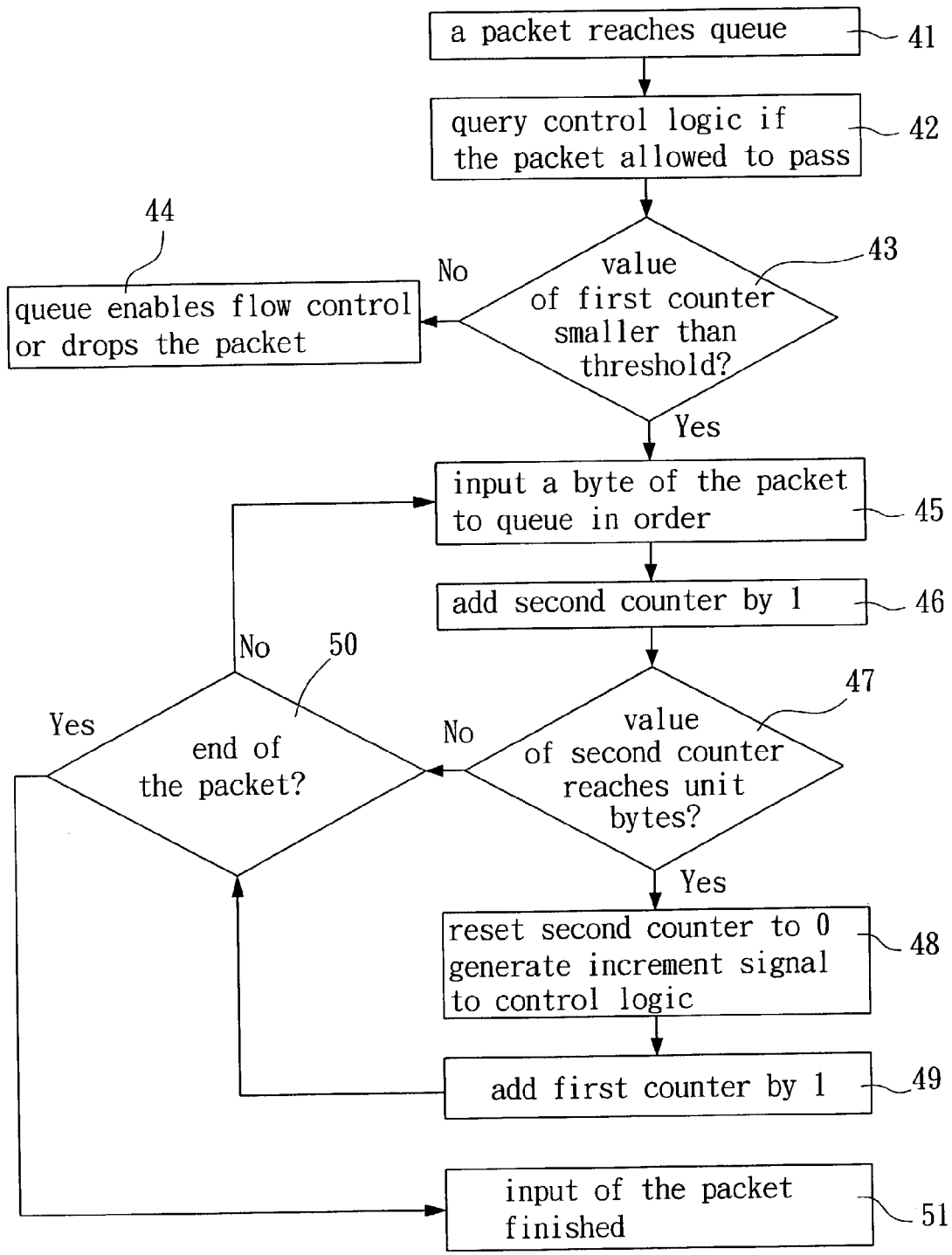
FIG. 4 is a flow chart of the bandwidth control method according the present invention for inputting a packet to a queue.

Next, a detailed description is provided to explain how to apply the bandwidth control apparatus 21 to control bandwidth precisely. The main feature of the bandwidth control method according to the present invention is that the timer 214 generates the decrement signal to the control logic 212 for decreasing the first counter 211 by one every one unit time, thereby allowing only one unit bytes for transmission constantly during one unit time. Please refer to FIG. 4, which is a flow chart of the bandwidth control method for inputting a packet to the queue 22. As shown in FIG. 4, the flow comprises steps of:

41 detecting that a packet reaches the queue 22;

42 the action device 213 querying the control logic 212 if the packet is allowed to enter the queue 22;

43 the control logic 212 determining if the value of the first counter 211 is smaller than the threshold of the first counter 211, if yes then the packet is allowed to enter and the flow proceeds to step 45, if no then the packet is not allowed to enter and the flow proceeds to step 44;

44 the queue 22 enabling flow control or dropping the packet based on the configuration of the queue 22;

45 the action device 213 inputting a byte of the packet to the queue 22 in order;

46 the action device 213 increasing the second counter 2131 by one;

47 the action device 213 determining if the value of the second counter reaches the size of unit bytes, if no then jumping to step 50, if yes then continuing below steps;

48 the action device 213 resetting the second counter 2131 to zero and generating the increment signal to the control logic 212;

49 the control logic 212 increasing the first counter 211 by one;

50 checking if the end of the packet has been inputted, if no then jumping back to the step 45, if yes then continuing below step; and 51 finishing input of the packet.

In the step 44, proper handling is necessary for the packet that is not allowed to enter the queue 22. There are two common ways for selection: one is enabling flow control, and the other is dropping the packets directly. If the flow control is adopted, then the switch controller 20 sends a flow control frame to the source of the packet to inform it of pausing to transmit packets. After waiting for a period of time, the source restores to send packets again. It depends on the configuration of the queue 22 to make the selection.

As for the length of unit time, it is determined based on required bandwidth specification and the size of unit bytes. Please refer to FIG. 5, which is a table showing how to select unit time under various bandwidth specifications and sizes of unit bytes. For instance, when the bandwidth is 128 Kbps (Kbits per second) and the unit bytes is 64 bytes long, 4 ms (1 ms=$10^{-3}$ second) is selected as the unit time. According to the above steps, the timer 214 generates a decrement signal to decrease the first counter 211 by one every 4 ms. In other words, one unit bytes of data, i.e. 64 bytes, is allowed to enter the queue 22 every 4 ms. Since one byte contains eight bits, the data volume allowed to enter the queue 22 every second is just equal to 128 Kb.

A special case can also be handled by utilizing the bandwidth control method of the present invention. Basically, the value of the first counter 211 cannot exceed its threshold. However, the special case may happen as follows: assuming a packet is allowed to enter the queue 22 with the value of the first counter 211 smaller than the threshold, as mentioned in the step 43; as each unit bytes is inputted in succession, the value of the first counter 211 may increase to its threshold, but the input of the packet has not been finished yet. At this time, the bandwidth control method of the present invention allows to continue to input the packet until the packet enters the queue 22 completely. The overused bandwidth is then taken off from the bandwidth for subsequent unit times. For example, if the value of the first counter 211 is larger than the threshold by one, that is, one more unit time of bandwidth has been used, then the switch controller 20 must wait for one more unit time than usual to make the first counter 211 restore to be smaller than its threshold, and then starts to input packets to the queue 22 again.

By employing the method mentioned above, the issue of data corruption and bandwidth waste caused by interruption of packet transmission can be avoided, and the bandwidth can still be controlled precisely in terms of a longer period. This is also an advantage of the present invention. Besides, with regard to the size of unit bytes and the threshold of the first counter 211, one skilled in the art should be able to make a selection or adjustment readily based on various applications or other factors.

While the present invention has been shown and described with reference to preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the sprit of the present invention.

What is claimed is:

1. A bandwidth control apparatus in a switch controller of a network switch, the switch controller comprising at least one queue for storing waiting-for-transmission packets, the bandwidth control apparatus comprising:
   a first counter, corresponding to the queue, having a default threshold;
   a control logic, coupled to the first counter, executing a operation of adding or subtracting the first counter by one, and determining if a packet is allowed to enter the queue;
   an action device, coupled to the queue and the control logic, performing actions of inputting the packet to the queue or outputting the packet from the queue, and sending a first signal to the control logic whenever one unit bytes is inputted; and
   a timer, coupled to the control logic, generating a second signal to the control logic every unit time;
   wherein when the control logic receives the first signal from the action device and the first counter does not reach the threshold, the first counter is increased by one; when the control logic receives the second signal from the timer and a value of the first counter is not zero, the first counter is decreased by one.

2. The bandwidth control apparatus as recited in claim 1, wherein the action device comprises a second counter associated with the queue, when a packet is permitted to enter the queue, the action device increases the second counter by one after inputting a byte; when a value of the second counter reaches a size of unit bytes, the action device generates the first signal to the control logic and resets the second counter to zero.

3. The bandwidth control apparatus as recited in claim 2, wherein the second counter is a ripple counter.

4. The bandwidth control apparatus as recited in claim 1, wherein the switch controller further comprises a register, coupled to the control logic, for storing the threshold of the first counter, the size of unit bytes and a length of unit time, which all can be accessed by the control logic.

5. A method for inputting a packet to a queue for network bandwidth control, comprising steps of:
   (a) receiving the packet;
   (b) checking if a value of a first counter is within a default threshold range;
   (c) if checking result of the step (b) being yes, then inputting a predetermined quantity of bytes of the packet to the queue and increasing a value of a second counter by a first value;
   (d) checking if the value of the second counter exceeds a default range of unit bytes;
   (e) if checking result of the step (d) being no, then jumping to the step (c); and
   (f) if the checking result of the step (d) being yes, then resetting the value of the second counter to a default value and increasing the value of the first counter by a second value;
   wherein the packet passes through the queue onto the network.

6. The method as recited in claim 5, further comprising a step (g) after the step (f):
   (g) checking if an end of the packet has been inputted, if no then jumping back to the step (c), if yes then finishing input of the packet.

7. The method as recited in claim 5, wherein if the checking result of the step (d) is no, then the method further comprises a step (e1) before jumping to the step (c):
   (e1) checking if an end of the packet has been inputted, if no then continuing to jump back to the step (c), if yes then finishing input of the packet.

8. The method for bandwidth control as recited in claim 5, further comprising a step (b1) between the steps (b) and (c):
   (b1) if the checking result of the step (b) being no, then the queue makes a selection between enabling a flow control process and dropping the packet.

9. The method as recited in claim 8, wherein the flow control process allows bandwidth to be overused by a period of time and is substantially idle the same period of time until the value of a first counter is within the default threshold range.

10. The method as recited in claim 5, wherein a timer is used to decrease the first counter by the second value every predetermined unit time.

11. The method as recited in claim 5, wherein the first value is 1.

12. The method as recited in claim 5, wherein the first value is −1.

13. The method as recited in claim 5, wherein the second value is 1.

14. The method as recited in claim 5, wherein the second value is −1.

15. A bandwidth control apparatus in a switch controller of a network switch, the switch controller comprising at least one queue for storing waiting-for-transmission packets, the bandwidth control apparatus comprising:
- a first counter, corresponding to the queue, having a default threshold;
- a control logic, coupled to the first counter, executing a operation of adding or subtracting the first counter by one, and determining if a packet is allowed to enter the queue;
- an action device, coupled to the queue and the control logic, performing actions of inputting the packet to the queue and outputting the packet from the queue, and sending a first signal to the control logic whenever one unit bytes is inputted; and
- a timer, coupled to the control logic, generating a second signal to the control logic every unit time;

wherein when the control logic receives the first signal from the action device and the first counter does not reach the threshold, the first counter is increased by one; when the control logic receives the second signal from the timer and a value of the first counter is not zero, the first counter is decreased by one.

16. The bandwidth control apparatus as recited in claim 15, wherein the action device comprises a second counter associated with the queue, when a packet is permitted to enter the queue, the action device increases the second counter by one after inputting a byte; when a value of the second counter reaches a size of unit bytes, the action device generates the first signal to the control logic and resets the second counter to zero.

17. The bandwidth control apparatus as recited in claim 15, wherein the switch controller further comprises a register, coupled to the control logic, for storing the threshold of the first counter, the size of unit bytes and a length of unit time, which all can be accessed by the control logic.

18. The bandwidth control apparatus as recited in claim 15, wherein the second counter is a ripple counter.

* * * * *